Oct. 31, 1961 L. Z. POKORNY 3,006,208
VARIABLE DIAMETER PULLEY

Filed Dec. 15, 1958 2 Sheets-Sheet 1

INVENTOR.
Laszlo Z. Pokorny
BY
W. E. Finken
His Attorney

INVENTOR.
Laszlo Z. Pokorny
BY
His Attorney

United States Patent Office 3,006,208
Patented Oct. 31, 1961

3,006,208
VARIABLE DIAMETER PULLEY
Laszlo Z. Pokorny, Rochester, N.Y., assignor to General Motors Corporation, Detroit, Mich., a corporation of Delaware
Filed Dec. 15, 1958, Ser. No. 780,369
9 Claims. (Cl. 74—230.17)

This invention pertains to pulleys, and particularly to thermally responsive variable diameter pulley assemblies.

In my earlier application Serial No. 765,090, filed October 3, 1958, a variable diameter pulley assembly is disclosed incorporating a differential area double bellows arrangement. The present invention relates to a simplified variable diameter pulley assembly utilizing an elastomeric diaphragm as the expansible and contractible wall of the chamber containing thermostatic liquid. Accordingly, among my objects are the provision of a temperature controlled variable diameter pulley assembly; the further provision of a variable diameter pulley assembly including a chamber containing thermostatic liquid having an expansible and contractible elastomeric wall; and the still further provision of a variable diameter pulley assembly including temperature responsive means for controlling the diameter thereof and resilient means for accommodating continued expansion of the thermostatic liquid when the pulley halves are fully closed.

The aforementioned and other objects are accomplished in the present invention by incorporating an elastomeric diaphragm in the movable pulley half. Specifically, the improved variable diameter pulley assembly includes a hub to which a first pulley half is attached. The hub is adapted for driving connection to a rotating power shaft. The movable pulley half is in the form of a drum, a portion of the inner axial wall of which is constituted by an elastomeric diaphragm. The inner axial wall of the drum is of stepped configuration, that is, it has portions of different diameter, and is telescopically arranged over a sleeve having complementary portions of different diameter and an end flange which coacts with the movable pulley half to determine the fully open position thereof.

The sleeve has a portion slidably mounted on the hub and a second portion including the stepped diameter parts thereof which are radially spaced from the hub so as to form a chamber within which an overload spring is disposed. One end of the overload spring engages the flanged end of the hub, and the other end of the overload spring engages an integral shoulder formed on the sleeve. The function of the overload spring is to facilitate continued expansion of thermostatic fluid contained within the drum type movable pulley half when the pulley halves are in the fully closed position. A spring for normally biasing the pulley halves to the fully open position may be used, and if used, this spring circumscribes the sleeve and hub, one end of the spring engaging the movable pulley half and the other end of the spring engaging an adjustable nut for adjusting the fully open and closed positions of the pulley halves.

In operation, a V-belt is received between the pulley halves, and in instances where the pulley opening spring is not utilized, the V-belt must be suitably tensioned so as to normally urge the pulley halves apart. The drum contains thermostatic liquid having a known coefficient of thermal expansion, and upon heating of the thermostatic liquid the movable pulley half will move towards the fixed pulley half to increase the pulley diameter. Conversely, upon cooling of the thermostatic liquid, either the tensioned belt, or the pulley opening spring will force the pulley halves apart so as to reduce the pulley diameter. The operation can be reversed by reversing the arrangement of the stepped configuration and the sleeve.

Further objects and advantages of the present invention will be apparent from the following description, reference being had to the accompanying drawings, wherein a preferred embodiment of the present invention is clearly shown.

Figure 1:
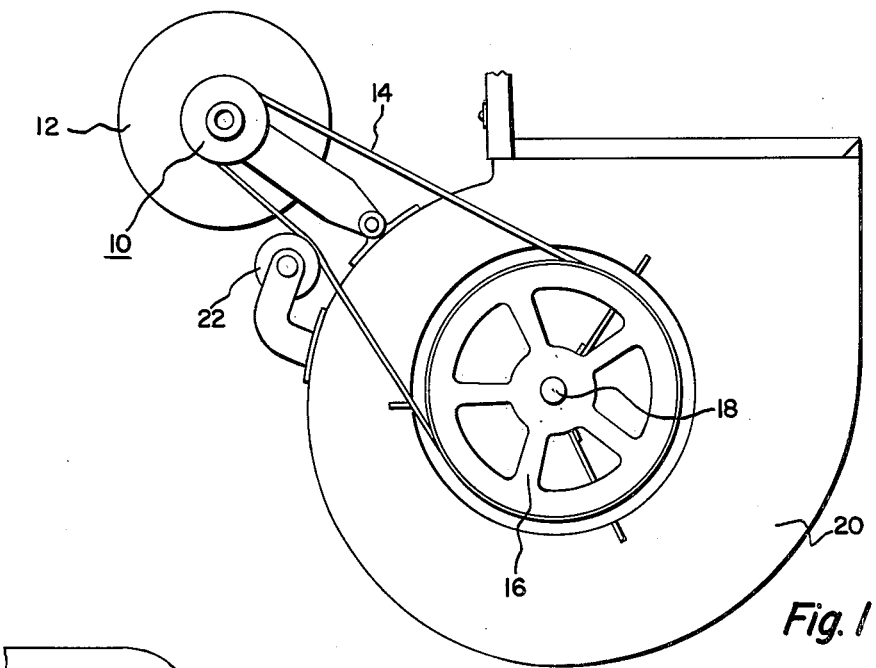
FIGURE 1 is a view in elevation of a motor driven centrifugal blower including the variable diameter pulley assembly of this invention.

With particular reference to FIGURE 1, a variable diameter pulley assembly is indicated generally by the numeral 10, this pulley assembly being associated with a centrifugal blower drive. The centrifugal blower drive includes an electric motor 12, a V-belt 14, a driven pulley 16 having a shaft 18 to which a blower wheel disposed within the volute casing 20 is attached, and a spring biased idler pulley 22 which maintains the requisite tautness in the V-belt 14.

Figure 2:
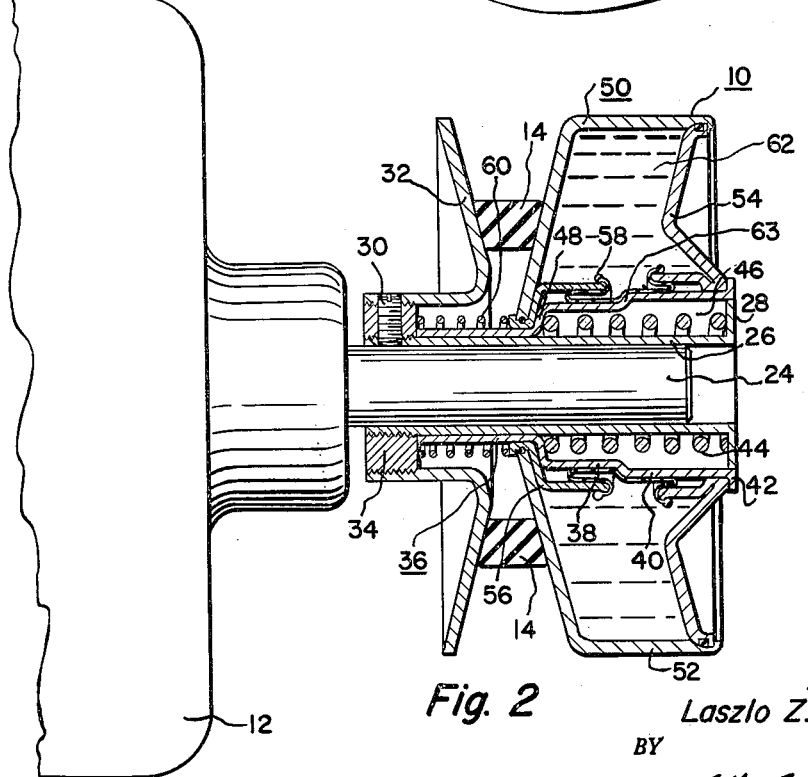
FIGURE 2 is a fragmentary view, partly in section and partly in elevation, illustrating the variable diameter pulley assembly of this invention in the fully open position.

With reference to FIGURE 2, the motor 12 has a drive shaft 24 extending axially therefrom upon which the variable diameter pulley assembly 10 is supported. The pulley assembly 10 includes a hub 26 having a flanged end 28. The hub 26 is attached to the shaft 24 by means of a set screw 30 which extends through a fixed pulley half 32 and an axially adjustable, internally and externally threaded nut 34. The nut 34 threadedly engages the fixed pulley half 32 as well as the hub 26.

A sleeve 36 is telescopically mounted in the hub 26, the sleeve being suitably keyed to the hub 26 so that while the sleeve 36 is axially movable relative to the hub 26 it is connected to rotate with the hub. The sleeve 36 is formed with stepped diameter portions 38 and 40 and an end flange 42. An overload compression spring 44 is disposed in the annular chamber 46 between the hub and stepped diameter portions 38 and 40 of the sleeve 36, one end of the spring 44 engaging the hub flange 28, and the other end of the spring 44 engaging an internal shoulder 48 on the sleeve 36.

A movable pulley half 50 in the form of a drum, or annulus, is telescopically mounted on the sleeve 36. The movable pulley half 50 is likewise suitably keyed to the sleeve 36 to prevent relative rotation therebetween while permitting relative axial movement therebetween. The movable pulley half 50 includes a flanged annulus 52 having a frusto conical radial end wall, an annulus 54 telescopically mounted on the stepped diameter portion 40 of the sleeve 36, and an annulus 56 slidably mounted on the smallest diameter portion of the sleeve 36. An elastomeric diaphragm 58 constituting expansible and contractible walls, has its ends suitably connected to the spaced apart ends of the annuli 54 and 56, the diaphragm 58 engaging the stepped diameter periphery of the sleeve 36. The diaphragm 58 constitutes a part of the inner axial wall of the annulus.

The fully open position of the pulley halves is depicted in FIGURE 2, this position being determined by the adjustment of the setting nut 34. As seen in FIGURE 2, the setting nut engages the end of the sleeve 36, and by adjusting the nut relative to the hub 26 and the fixed pulley half 32, the fully open position of the pulley halves can be varied. Furthermore, as shown in FIGURE 2, a compression spring 60 may be interposed between the setting nut 34 and the movable pulley half 50, the spring 60 acting to urge the movable pulley half to the fully open position.

A thermostatic fluid 62 is sealed within the drum type movable pulley half 50 by the elastomeric diaphragm 58. The pulley assembly is shown in the fully open position in FIGURE 2. Upon heating of the thermostatic fluid 62, the fluid will expand. The pressure created by expansion of the fluid 62 reacts between annulus 56 and the shoulder 63 of the sleeve 36. Since the shoulder 48 of the sleeve 36 is normally maintained in engagement with the annulus 56 by the spring 44, the reaction pressure of the fluid 62 effects movement of the pulley half 50 towards the fixed pulley half 32. This movement will be allowed by the diaphragm 58 as seen in FIGURE 3, and in this manner the movable pulley half 50 can be moved into engagement with the fixed pulley half 32 to increase the pitch diameter of the pulley to a maximum.

Figure 3:
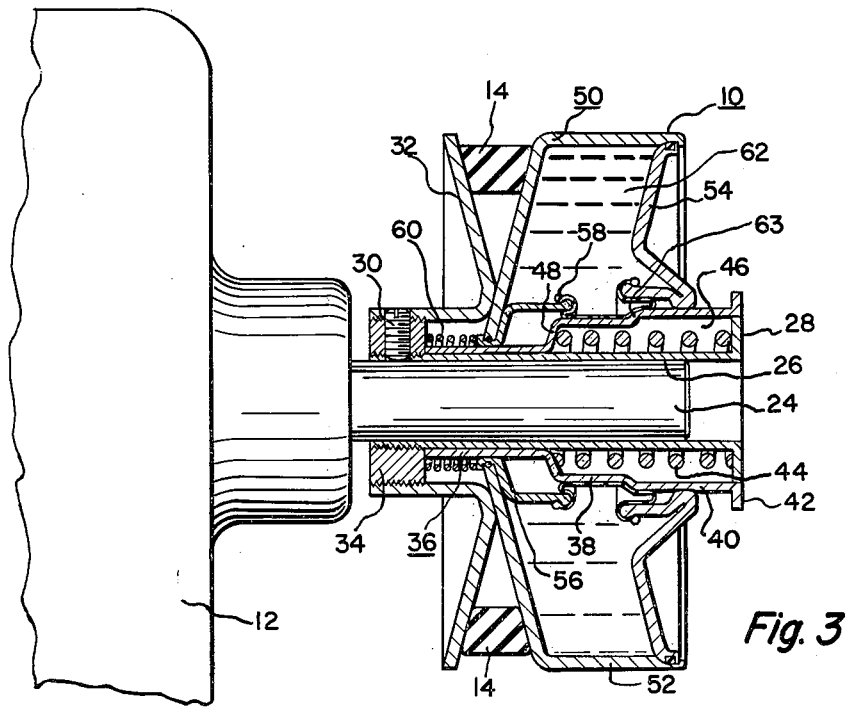
FIGURE 3 is a fragmentary view, partly in section and partly in elevation, illustrating the pulley assembly in the fully closed position.
Figure 4:
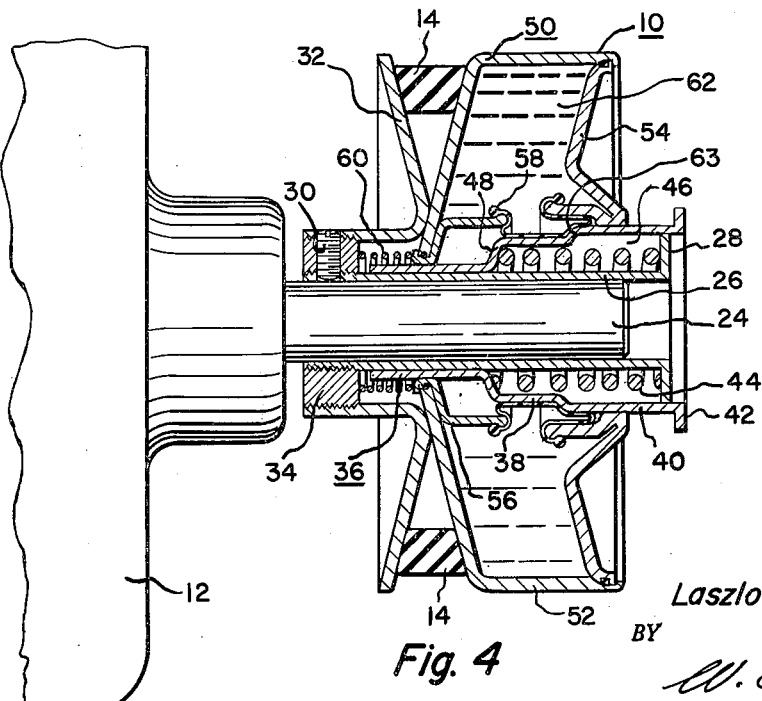
FIGURE 4 is a fragmentary view, partly in section and partly in elevation, illustrating the pulley assembly in the fully closed position with the overload spring partially compressed.

If heat should continue to be supplied to the thermostatic fluid 62 after the pulley halves are fully closed, as shown in FIGURE 3, the thermostatic fluid 62 will continue to expand. However, since the pulley halves are fully closed the diaphragm 58 reacts against the shoulder 63 on the sleeve 36 thereby moving the sleeve 36 to the right, as viewed in FIGURE 3, to the position of FIGURE 4. Thus, the spring 44 constitutes an overload protection device designed to accommodate over expansion of the thermostatic fluid when the pulley halves are fully closed without damaging the pulley assembly.

Upon cooling of the thermostatic fluid 62, when the pulley halves are fully closed, as indicated in FIGURE 3, the thermostatic fluid 62 will contract and the spring 60, or the tension in the V-volt 14, will move the pulley half 50 away from the pulley half 32 to reduce the pitch diameter of the pulley assembly.

While the embodiment of the invention as herein disclosed constitutes a preferred form, it is to be understood that other forms might be adopted.

What is claimed is as follows:

1. A variable diameter pulley assembly including, a hub, a first pulley half immovably attached to said hub, a second pulley half rotatable with said hub but movable axially relative thereto, a sleeve rotatable with said hub but movable axially relative thereto, said second pulley half being in the form of an annulus having at least a part of its inner axial wall formed by an elastomeric diaphragm, said elastomeric diaphragm engaging a pair of spaced reaction shoulders, one of said shoulders being on said annulus and the other of said shoulders being on said sleeve, and expansible temperature-responsive means contained within said annulus for effecting axial movement of said second pulley half.

2. A variable diameter pulley assembly including, a hub, a first pulley half immovably attached to said hub, a second pulley half rotatable with said hub but movable axially relative thereto, a sleeve rotatable with said hub but movable axially relative thereto and having a stepped diameter portion, said second pulley half being in the form of an annulus having at least a part of its inner axial wall formed by an elastomeric diaphragm engageable with the stepped diameter portion of said sleeve, and a thermostatic fluid contained within said annulus whereby volumetric changes of said fluid will effect movement of said second pulley half so as to vary the pitch diameter of said pulley assembly.

3. A variable diameter pulley assembly including, a hub, a first pulley half immovably attached to said hub, a second pulley half rotatable with said hub but movable axially relative thereto, a sleeve rotatable with said hub but movable axially relative thereto and having a stepped diameter portion and an end flange, said movable pulley half being in the form of an annulus having at least a portion of its inner axial wall formed by an elastomeric diaphragm for engaging the stepped diameter portion of said sleeve, the end of said annulus being engageable with the end flange of said sleeve to determine the fully open position of said pulley halves, and a thermostatic fluid contained within said annulus and responsive to temperature changes for adjusting the position of said second pulley half relative to the first pulley half.

4. A variable diameter pulley assembly including, a hub, a first pulley half immovably connected to said hub, a second pulley half in the form of an annulus rotatable with said hub but movable axially relative thereto, a sleeve rotatable with said hub but movable axially relative thereto, and an elastomeric diaphragm constituting at least a portion of the inner axial wall of said annulus and engaging a pair of spaced reaction shoulders, one of said shoulders being on said annulus and the other shoulder being on said sleeve, said diaphragm forming a sealed chamber containing a thermostatic fluid whereby changes in the volume of said fluid will vary the pitch diameter of said pulley assembly.

5. A variable diameter pulley assembly including, a hub, a first pulley half connected to said hub, a second pulley half in the form of an annulus rotatable with said hub but movable axially relative thereto, a sleeve rotatable with said hub but movable axially relative thereto including a stepped diameter portion spaced from said hub and having a shoulder, and an elastomeric diaphragm engaging said stepped diameter portion and constituting at least a portion of the inner axial wall of said annulus to form a sealed chamber containing thermostatic fluid whereby changes in volume of the thermostatic fluid will vary the pitch diameter of said pulley assembly.

6. The pulley assembly set forth in claim 5 wherein said sleeve is formed with an end flange engageable with said annulus to determine the fully open position of said pulley.

7. The pulley assembly set forth in claim 6 including means disposed between said first pulley half and said hub for adjusting the axial position of said sleeve.

8. The pulley assembly set forth in claim 5 wherein said hub includes a flanged end, and wherein said pulley assembly includes an overload spring disposed in the space between the stepped diameter portion of said sleeve and said hub, one end of said spring engaging the end flange on said hub and the other end of said flange engaging the shoulder on said sleeve.

9. The pulley assembly set forth in claim 5 including spring means disposed between said first and second pulley halves for normally biasing said second pulley half to the fully open position.

References Cited in the file of this patent
UNITED STATES PATENTS

| 2,369,681 | Miles | Feb. 20, 1945 |
| 2,463,031 | Hallinan | Mar. 1, 1949 |
| 2,658,400 | Dodge | Nov. 10, 1953 |
| 2,844,963 | Stewart | July 29, 1958 |